H. G. DEWEY.
ROTATABLE CHOPPER HEAD.
APPLICATION FILED JUNE 7, 1918. RENEWED MAR. 13, 1919.

1,302,015.

Patented Apr. 29, 1919.

Inventor
H. G. Dewey
C. L. Parker
By
Attorney

UNITED STATES PATENT OFFICE.

HAYWOOD GUION DEWEY, OF ROCHESTER, NEW YORK, ASSIGNOR TO JACKSON BRANDT, OF BALTIMORE, MARYLAND.

ROTATABLE CHOPPER-HEAD.

1,302,015.   Specification of Letters Patent.   Patented Apr. 29, 1919.

Application filed June 7, 1918, Serial No. 238,698. Renewed March 13, 1919. Serial No. 282,494.

*To all whom it may concern:*

Be it known that I, HAYWOOD GUION DEWEY, a citizen of the United States, residing at Rochester, in the county of Monroe and State of New York, have invented certain new and useful Improvements in Rotatable Chopper-Heads, of which the following is a specification.

My invention relates to improvements in rotatable chopper-heads, of cotton chopping machines.

An important object of the invention is to provide a chopper-head of the above mentioned character, having means whereby the blades thereof may be conveniently angularly adjusted, and locked in adjustment at the desired position.

A further object of the invention is to provide a chopper-head having blades which are curved longitudinally in arcs having smaller diameters than the diameter of the chopper-head, as a whole, whereby the chopper-head will cut deeper into the hill between the plants which are left standing, the cut gradually decreasing in depth toward the plants which are left standing.

Other objects and advantages of the invention will be apparent during the course of the following description.

This application is partly a continuation of my copending application for cotton chopper, Serial No. 146,755, filed February 5, 1917, in which a rotatable chopper-head is shown and described but not claimed *per se*.

Figure 1:
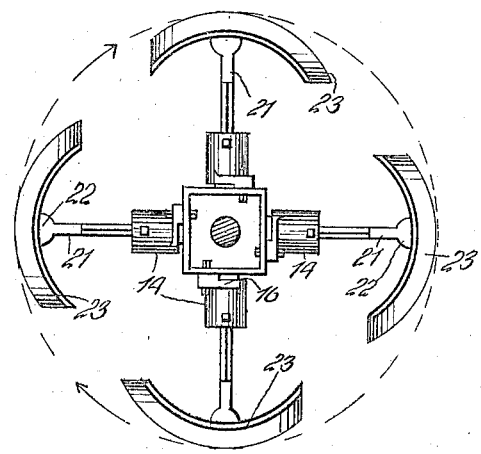
Figure 2:
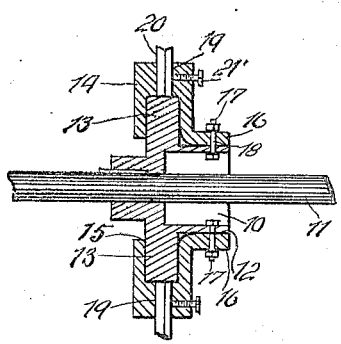
Figure 3:
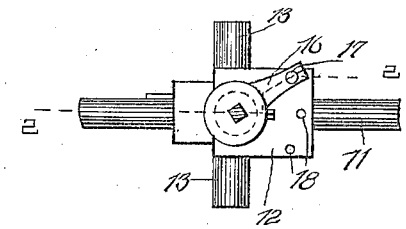
Figure 4:
Figure 5:
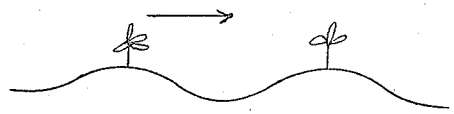

In the accompanying drawing forming a part of this specification and in which like numerals are employed to designate like parts throughout the same, Figure 1 is a side elevation of a rotatable chopper-head embodying my invention, Fig. 2 is a longitudinal vertical section taken on line 2—2 of Fig. 3, Fig. 3 is a plan view of the hub of the chopper-head, Fig. 4 is a plan view of one of the blades of the chopper-head, and Fig. 5 is a diagrammatic view of a row of cotton plants, illustrating the way in which the chopper-head cuts the row in thinning out the cotton plants.

In the drawings, wherein for the purpose of illustration is shown a preferred embodiment of my invention, the numeral 10 designates the hub of the chopper-head, which is rigidly secured upon a rotatable shaft 11, extending longitudinally of the cotton chopping machine, (not shown). The hub 10 is preferably hollow and is formed square in cross-section, providing flat faces 12 which are disposed at a right angle to each other. The flat faces 12 carry radially extending cylindrical bosses 13, preferably formed integral therewith and upon which are pivoted tubular couplings 14, having enlarged cylindrical openings 15, which receive the bosses 13, as shown. Rigidly connected with the inner ends of the tubular couplings 14 and preferably formed integral therewith are cranks or arms 16, apertured for the reception of bolts 17, adapted for insertion within certain of the apertures 18 formed in the flat faces 12, as shown. The tubular couplings 14 are provided in their outer portions with longitudinally extending openings 19, preferably square in cross-section, and adapted for the reception of the inner ends 20 of arms 21. These inner ends 20 are also formed square in cross-section to properly fit within the openings 19. The arms 20 are clamped within the openings 19 by bolts 21'. The arms 21 are radially disposed and have their outer ends flattened, as shown at 22, for connection with blades 23. These blades 23 are curved upon arcs having smaller diameters than the diameter of the chopper-head, as a whole, and this is an important feature of the invention, since it enables the blades 23 to chop out the cotton plants in a peculiar manner, as will be more fully described. It is apparent that by swinging the cranks 16 to different angular positions with respect to the flat faces 12, the arms 21 may be turned upon their longitudinal axes and the blades 23 angularly adjusted.

In the operation of the chopper-head, the rotatable shaft 11 extends longitudinally of the cotton chopping machine, and this machine is driven longitudinally of the row of cotton to be chopped, as is well known. The chopper-head is therefore rotated above and transversely of the row. By virtue of the fact that the blades 23 are curved longitudinally upon arcs having smaller diameters than the diameter of the chopper-head, as a whole, the opposite ends of each blade are arranged inwardly of the central portion of the blade. This being the case, the blades, when cutting out the hill, make the cut the deepest between the cotton plants which are left standing, and the cut gradually decreases in depth toward such plants, as clearly indicated in Fig. 5.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A rotatable chopper-head comprising a hub provided with radially extending bosses, tubular couplings pivoted upon the bosses and having cranks, means to lock the cranks in adjustment in desired positions to the hub, radially extending rods secured within the tubular couplings, and chopper blades secured to the outer ends of the rods.

2. A rotatable chopper-head comprising a hub formed hollow and polygonal in cross-section for providing flat apertured faces, said faces carrying bosses secured thereto, tubular couplings having inner enlarged openings pivotally receiving the bosses and outer openings formed polygonal in cross-section, cranks radially secured to the tubular couplings, and carrying locking elements adapted for insertion within the apertures of the flat faces, rods having inner portions formed polygonal in cross-section and adapted for insertion within the polygonal openings of the tubular couplings, and cutter blades secured to the rods.

In testimony whereof I affix my signature in presence of two witnesses.

HAYWOOD GUION DEWEY.

Witnesses:
C. E. MARTIN,
JOHN G. CAPSTAFF.

Copies of this patent may be obtained for five cents each, by addressing the "Commissioner of Patents, Washington, D. C."